(12) United States Patent
Ellis et al.

(10) Patent No.: US 11,975,822 B2
(45) Date of Patent: May 7, 2024

(54) METHODS FOR MONITORING SERVICE INTERVAL OF AN ACTUATOR

(71) Applicants: Safran Landing Systems, Velizy-Villacoublay (FR); Safran Landing Systems Canada Inc., Ajax (CA)

(72) Inventors: Andrew Michael Ellis, Guelph (CA); Graeme Peter Arthur Klim, Vélizy-Villacoublay (FR); Aakash Gohil, Toronto (CA); Pierrick Géraud Alexandre Lemonnier, Ajax (CA); Leszek Marian Dacko, Toronto (CA)

(73) Assignees: Safran Landing Systems, Velizy-Villacoublay (FR); Safran Landing Systems Canada Inc., Ajax (CA)

( * ) Notice: Subject to any disclaimer, the term of this patent is extended or adjusted under 35 U.S.C. 154(b) by 770 days.

(21) Appl. No.: 17/092,798

(22) Filed: Nov. 9, 2020

(65) Prior Publication Data
US 2022/0144415 A1 May 12, 2022

(51) Int. Cl.
*B64C 25/28* (2006.01)
*B64C 25/20* (2006.01)
(Continued)

(52) U.S. Cl.
CPC .............. *B64C 25/28* (2013.01); *B64C 25/20* (2013.01); *B64F 5/60* (2017.01); *G01D 5/145* (2013.01)

(58) Field of Classification Search
CPC ........... B64C 25/28; B64C 25/20; B64F 5/60; G01D 5/145; B61B 13/08
See application file for complete search history.

(56) References Cited

U.S. PATENT DOCUMENTS

| 2006/0144997 A1 | 7/2006 | Schmidt et al. |
| 2007/0203656 A1* | 8/2007 | Sheahan ............ G05B 19/4065 |
| | | 702/108 |

(Continued)

FOREIGN PATENT DOCUMENTS

| CA | 3002061 A1 | 10/2018 |
| DE | 10 2012 022 661 A1 | 5/2014 |
| JP | 2002028961 A | 1/2002 |

OTHER PUBLICATIONS

Swerdon et al.; Systems Engineering Approach to Electro-Mechanical Actuator Diagnostic and Prognostic Development; Machinery Failure Prevention Technology (MFPT) Conf.; 2009; pp. 1-15 (Year: 2009).*

(Continued)

*Primary Examiner* — Michael J Zanelli
(74) *Attorney, Agent, or Firm* — CHRISTENSEN O'CONNOR JOHNSON KINDNESS PLLC

(57) ABSTRACT

A method of determining a service interval for an actuator of a landing gear assembly is suitable for used with a landing gear assembly in which the actuator positions the landing gear assembly between a stowed position and a deployed position. The method includes the steps of determining an actuator travel value for a time interval and increasing a total actuator accumulated travel value by the actuator travel value for the time interval. The method further includes the step of comparing the total actuator accumulated travel value to a predetermined value.

17 Claims, 9 Drawing Sheets

(51) Int. Cl.
*B64F 5/60* (2017.01)
*G01D 5/14* (2006.01)

(56) References Cited

U.S. PATENT DOCUMENTS

| | | |
|---|---|---|
| 2008/0033607 A1 | 2/2008 | Zeliff et al. |
| 2010/0281967 A1 | 11/2010 | Cahill |
| 2018/0312245 A1 | 11/2018 | Klim et al. |
| 2019/0002120 A1 | 1/2019 | Vinson et al. |
| 2019/0048988 A1 | 2/2019 | Besser et al. |
| 2019/0093913 A1 | 3/2019 | Mikulica et al. |
| 2021/0071742 A1* | 3/2021 | Huynh ................ F16H 25/2204 |
| 2021/0102561 A1* | 4/2021 | Aki ...................... F15B 15/204 |

OTHER PUBLICATIONS

International Search Report and Written Opinion dated Jan. 13, 2022, issued in corresponding International Application No. PCT/CA2021/051570, filed Nov. 4, 2021, 11 pages.

* cited by examiner

METHODS FOR MONITORING SERVICE INTERVAL OF AN ACTUATOR

BACKGROUND

Vehicles with takeoff and landing functionality, such as aircraft, magnetic levitation (maglev) vehicles, etc., typically have landing gear systems that reciprocate between an extended (deployed) position and a retracted (stowed) position. When the vehicle is not airborne or levitated, or is not otherwise supported by a ground surface, the landing gear system is extended and in contact with the ground (or other support surface) to support the vehicle. When the vehicle is airborne or otherwise levitated, the landing gear system retracts to reduce drag and to prevent damage to the landing gear system that may occur at high speed travel.

Some vehicles, such as maglev vehicles in particular, also perform stabilization functions while the vehicle is fully or partially supported by the landing gear system. During stabilization procedures, individual landing gear assemblies of the landing gear system are selectively extended and retracted in small increments in order to maintain a target load on individual landing gear assemblies and/or to provide a smooth and level ride for the vehicle. In one nonlimiting embodiment, a load on each landing gear assembly is sensed, and each landing gear assembly is controlled by a closed-loop control system to extend and retract incrementally in order to maintain a target load. In another nonlimiting embodiment, a vehicle height is sensed at one or more landing gear assembly positions, and each landing gear assembly is controlled by a closed-loop control system to extend and retract incrementally in order to maintain a predetermined vehicle height at each landing gear assembly location and/or to maintain a predetermined relationship between the sensed vehicle heights.

As will be describe in further detail, known landing gear assemblies use actuators to drive the extension and retraction motion. One suitable actuator includes an ACME nut/drive screw combination, wherein selective rotation of the ACME nut translates ACME screw along a longitudinal axis. These and other actuator configurations require periodic service, including greasing, to maximize service life by reducing wear, decrease unwanted heat generation, increase drive torque, etc. However, maglev vehicles operate in an evacuated low-pressure environment that makes servicing the landing gear actuators difficult. Accordingly, it is desirable to provide a service schedule that is frequent enough to prevent the foregoing detrimental effects, but not so frequent as to create unnecessary vehicle downtime.

Service intervals for landing gear systems are typically based on a number of extension/retraction cycles. For aircraft, a cycle may be defined as one flight cycle, wherein the landing gear system moves from a fully extended position on the ground to a retracted position in flight and back to a fully extended position after landing. Thus, for an aircraft, a cycle corresponds to a fixed amount of landing gear travel, i.e., one full retraction motion and one full extension motion.

For maglev vehicles and other vehicles with stabilization capabilities, the amount of landing gear travel during a traditional "cycle" can vary due to extension and retraction of the landing gear assemblies during the stabilization process. That is, the stabilization process makes the total amount of landing gear travel inherently unpredictable, and known methods for monitoring landing gear usage do not provide for accurate indications of when the landing gear, and in particular, the landing gear actuators, require servicing.

SUMMARY

The subject matter disclosed herein provides methods for accurately monitoring the use of landing gear actuators to determine when actuator servicing is necessary. In one embodiment, the actuator includes an ACME screw and a nut, and the method determines a value corresponding to total actuator travel. This total actuator travel value accounts for localized extension and retraction of the landing gear assembly during stabilization processes.

A first representative embodiment of a method of determining a service interval for an actuator of a landing gear assembly is suitable for use with a landing gear assembly in which the actuator positions the landing gear assembly between a stowed position and a deployed position. In an embodiment, the method includes the steps of determining an actuator travel value for a time interval and increasing a total actuator accumulated travel value by the actuator travel value for the time interval. The method further includes the step of comparing the total actuator accumulated travel value to a predetermined value.

In any embodiment, the step of increasing the total actuator accumulated travel value by the actuator travel value for the time interval comprises adding an absolute value of the actuator travel value to the total actuator accumulated travel value.

In any embodiment, the method further includes the step of generating a signal indicating a service requirement when the total actuator accumulated travel value is greater than the predetermined value.

In any embodiment, the actuator comprises a drive screw in threaded engagement with a nut, wherein selectively rotation of the drive screw extends and retracts the landing gear assembly.

In any embodiment, the step of determining an actuator travel value for a time interval comprises sensing a drive screw rotation.

In any embodiment, the step of determining an actuator travel value for a time interval comprises determining a distance traveled by the nut.

In any embodiment, the landing gear assembly is configured to provide a stabilization function that extends and retracts the landing gear assembly, wherein at least one time interval occurs during the stabilization function.

In any embodiment, the actuator is one of a linear actuator and a rotary actuator.

A second representative embodiment of a method of determining a service interval for an actuator of a landing gear assembly is suitable for use with a landing gear assembly that is selectively moveable through a plurality of landing gear assembly positions between a stowed position and a deployed position, wherein each landing gear assembly position corresponds to one of a plurality of predetermined actuator positions. In an embodiment, the method comprising the steps of sensing an actuator position and increasing a total actuator accumulated travel count by a predetermined amount when the sensed actuator position passes through one of the plurality of predetermined actuator positions. The method further includes the step of comparing the total actuator accumulated travel value to a predetermined value.

In any embodiment, the method further includes the step of generating a signal indicating a service requirement when the total actuator accumulated travel value is greater than the predetermined value.

In any embodiment, the method further includes the steps of increasing an individual actuator accumulated travel count corresponding to one of the plurality of landing gear assembly positions when the sensed actuator position passes through the corresponding one of the plurality of landing gear assembly positions and comparing each individual actuator accumulated travel count to a corresponding threshold.

In any embodiment, the method further includes the step of generating a second signal indicating a service requirement when at least one of the individual actuator accumulated travel counts is greater than the corresponding threshold.

In any embodiment, the actuator position is sensed directly.

In any embodiment, the actuator comprises a drive screw in threaded engagement with a nut, wherein selective rotation of the drive screw extends and retracts the landing gear assembly.

In any embodiment, the step of determining an actuator travel value for a time interval comprises sensing a drive screw rotation.

In any embodiment, the step of determining an actuator travel value for a time interval comprises determining a distance traveled by the nut.

In any embodiment, the actuator position is sensed indirectly.

In any embodiment, the landing gear assembly is configured to provide a stabilization function that extends and retracts the landing gear assembly, wherein the sensed actuator position passes through at least one of the plurality of predetermined actuator positions during a stabilization function.

In any embodiment, the actuator is one of a linear actuator and a rotary actuator.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

Figure 1:
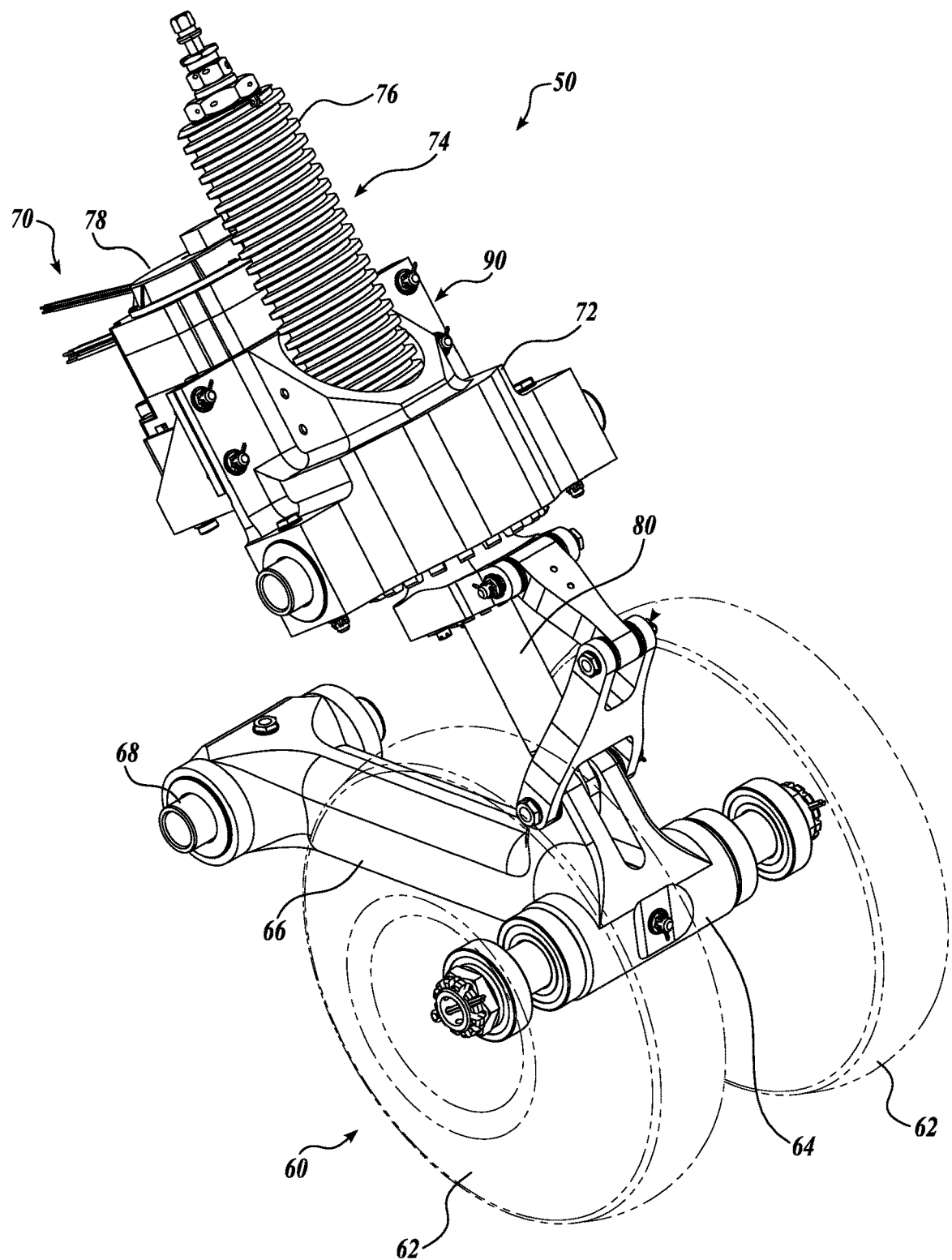
FIG. 1 shows a known landing gear assembly with an actuator suitable for use on a maglev vehicle.

FIG. 1 shows a representative embodiment of a known landing gear assembly 50 that includes a wheel assembly 60 and a shock strut 70 that is extendable and retractable. The wheel assembly 60 and shock strut 70 are suitable to for use as part of one or more of the independently actuated landing gear assemblies 50 described in the present disclosure. The landing gear assembly 50 is disclosed in U.S. Pat. No. 10,549,848 ("Klim et al."), issued Feb. 4, 2020, and currently assigned to Safran Landing Systems Canada Inc., the disclosure of which is expressly incorporated herein.

As shown in FIG. 1, the wheel assembly 60 of landing gear assembly 50 is coupled to the shock strut 70, which selectively drives extension and retraction of the landing gear assembly 50. The wheel assembly 60 includes a pair of wheels 62 rotatably mounted to an axle 64 that is positioned at one end of a trailing arm body 66. A pivot pin 68 is positioned at the other end of the trailing arm body 66 to rotatably couple the trailing arm body to the vehicle.

The shock strut 70 includes a housing 72 pivotably mounted to the vehicle (not shown), such as an aircraft or a maglev vehicle. A drive screw 74 extends through an aperture in the housing 72 and includes an external screw thread 76 that engages an internal screw thread formed in the aperture of the housing 72. A piston 80 extends from the drive screw 74 to operatively couple the drive screw 74 to the wheel assembly 60.

A motor 78 is mounted to the housing 72 and is operably coupled to the drive screw 74 to selectively rotate drive screw about a longitudinal axis. The drive screw 74, housing 72, and motor 78 cooperate to function as an actuator 90 that extends and retracts the landing gear assembly 50. In this regard, the housing 72 includes a geared nut (not shown) that is selectively rotated by the motor 78 and is threadedly engaged with the drive screw 74. The selective rotation of the geared nut translates the drive screw 74 in an axial direction relative to the housing 72. This translation of the drive screw 74 rotates the wheel assembly 20 about its pivotal connection to the vehicle, thereby extending and retracting the landing gear assembly 50.

Figure 2:
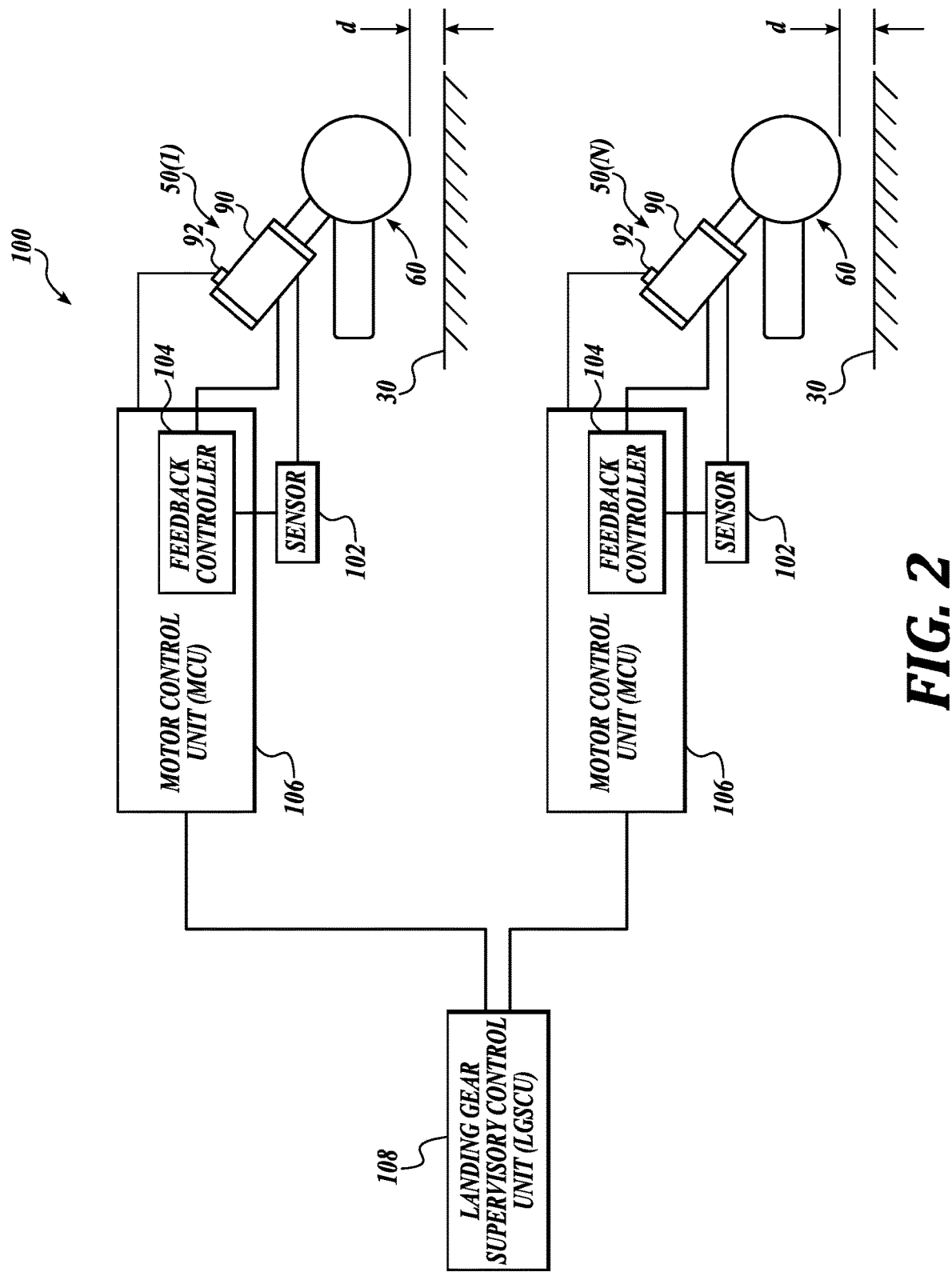
FIG. 2 shows a schematic view of a representative embodiment of a landing gear system for a maglev vehicle using a plurality of the landing gear assemblies similar to the landing gear assembly shown in FIG. 1.

FIG. 2 shows an exemplary embodiment of a landing gear system 100 suitable for use on a maglev vehicle according to the present disclosure. In the illustrated example, the landing gear system 100 is shown with a number N of landing gear assemblies 50(1) through 50(N), wherein each landing gear assembly is similar to the landing gear assembly 50 shown in FIG. 1. It will be appreciated that the landing gear system is exemplary and should not be considered limiting. In this regard, other landing gear systems with different numbers and types of landing gear assemblies are possible. Further combinations of different types of landing gear assemblies may be used within the same landing gear system 100. These and other variations are contemplated and should be considered within the scope of the present disclosure Each landing gear assembly 50 is communicatively coupled to a Motor Control Unit 106 (MCU). The MCU 106 controls the corresponding actuator 90 to selectively extend and retract the associated landing gear assembly 50. In this regard, each MCU 106 includes a feedback controller 104 operatively coupled to a sensor 102 that senses a distance d to the ground 30. The feedback controller 104 receives a signal from the sensor 102 and provides closed-loop control of the actuator 90 to maintain a target distance d at each landing gear assembly. In some embodiments, the sensor 102 senses a load on the corresponding landing gear assembly, and the feedback controller provides closed-loop control of the actuator 90 to maintain a target load on the corresponding landing gear assembly.

Each MCU 106 is also operatively coupled to an actuator position sensor 92 operatively coupled to the associated landing gear assembly 50. The actuator position sensor 92 senses a position and/or movement of the actuator 90 and provides a signal to the MCU 106 that is used to monitor service intervals for the actuator, as explained in further detail below.

A Landing Gear Supervisory Control Unit 108 (LGSCU), is communicatively coupled to and controls the MCU 106 of each landing gear assembly 50. The LGSCU 108 coordinates the operation of the MCUs 106 and thus, the landing gear assemblies 50.

In some embodiments, additional copies of MCU 106, LGSCU 108, and/or other components may be provided for redundancy. Further, the components of landing gear system 100 may be communicatively coupled via any suitable communication technique, including but not limited to serial wired communication, wireless communication (via Bluetooth, Wi-Fi, or other wireless communication techniques), and/or networked wired communication (via USB, Ethernet, CANBUS, or other wired communication techniques). Also, the separation of functionality between the MCU 106 and LGSCU 108 is an example only, and in some embodiments, functionality of the MCU 106 and LGSCU 108 may be combined in a single device.

Figure 3:
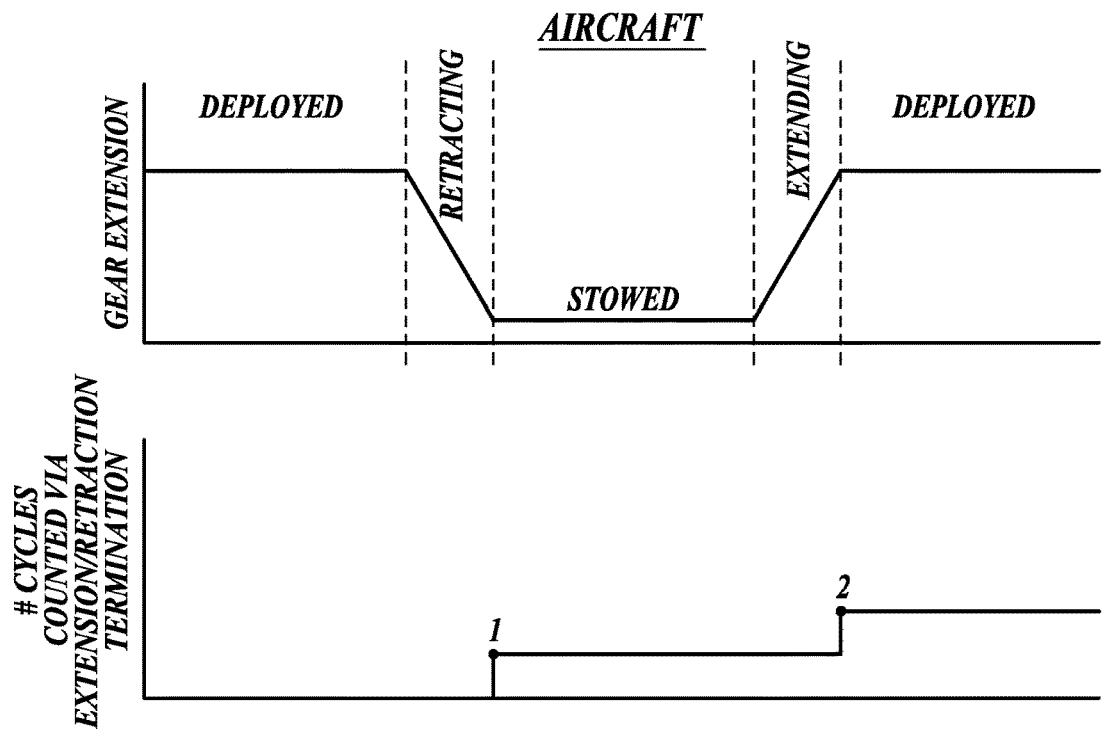
FIG. 3 shows a graph of a known landing gear extension and retraction for an aircraft and a number of associated cycles determined by a known method.
Figure 4:
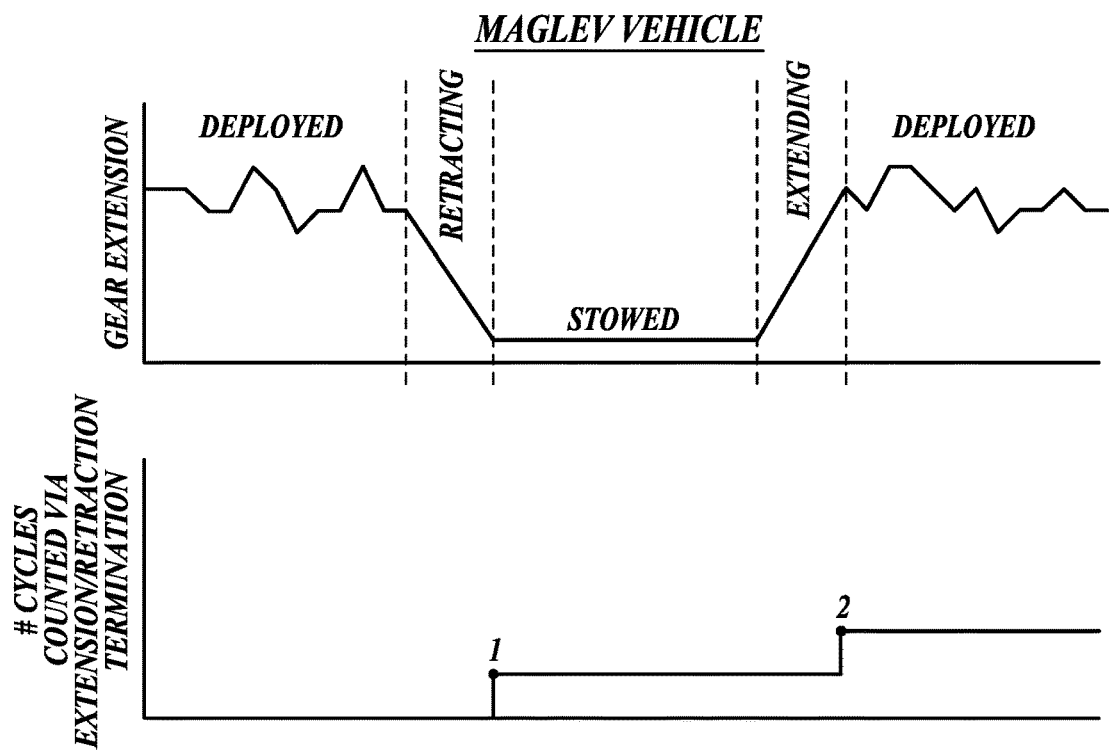
FIG. 4 shows a graph of a known landing gear extension and retraction for a maglev vehicle with stabilization functionality and a number of associated cycles determined by a known method.

FIGS. 3 and 4 illustrate typical landing gear extension of aircraft and maglev vehicles, respectively, along with how cycles for these landing gears are counted to determining service requirements. Referring to FIG. 3, the typical extension/retraction of an aircraft starts with the landing gear fully extended (deployed) while the aircraft is on the ground. Upon takeoff, the landing gear is fully retracted (stowed) while the aircraft is in flight. Just prior to landing, the landing gear returns to the fully extended position, where the landing gear remains until the next aircraft takeoff. When deployed or stowed, the aircraft landing gear is generally stationary. Thus, landing gear motion only occurs when the land gear is extending or retracting.

Still referring to FIG. 3, typical aircraft landing gear cycles for maintenance purposes are considered to occur upon the end of a landing gear extension or a landing gear retraction. Because motion of the aircraft landing gear is limited to the extension and retraction phases, the defined landing gear cycles accurately correspond to the actual motion of the landing gear.

Referring to FIG. 4, a typical extension/retraction motion for a maglev vehicle is shown. Similar to the landing gear of an aircraft, the landing gear of the maglev is extended (deployed) while the maglev vehicle is supported by the ground and retracted (stowed) while the maglev vehicle is supported by magnetic levitation. Unlike an aircraft, when the maglev vehicle is supported by the ground, the fully extended landing gear undergoes minor movement under closed-loop control to provide load and/or height stabilization.

Still referring to FIG. 4, when a landing gear cycle for maintenance purposes of a maglev vehicle is considered to occur upon the end of a landing gear extension or a landing gear retraction (similar to an aircraft), the number of cycles does not accurately reflect the actual motion of the landing gear. That is, a maglev landing gear undergoes frequent localized corrections in both the extension and retraction directions during stabilization processes. This motion is not accounted for under typical monitoring methods. Moreover, because such stabilization functions are inherently unpredictable, it is not possible to simply apply a correction factor to accurately account for this additional movement.

The present disclosure describes various embodiments of methods for monitoring the movement of landing gear assemblies to accurately reflect the total movement of the landing gear assemblies during use. While generally described with respect to drive screw actuators for landing gear assemblies in the context of greasing requirements, it will be appreciated that the disclosed methods are not limited to these applications. In some embodiments, the methods may be used with other types of actuators such as hydraulic actuators, pneumatic actuators, or any other suitable type actuators. Embodiments of the disclosed methods may also be used in conjunction with rotary actuators or other types of linear actuators, including actuators used with moveable structure other than landing gear assemblies. In still other embodiments, the disclosed methods may monitor movement of the landing gear components themselves instead of the actuator in order to determine maintenance requirements of the actuators or other moveable components. These and other variations are contemplated and should be considered within the scope of the present disclosure.

Figure 5:
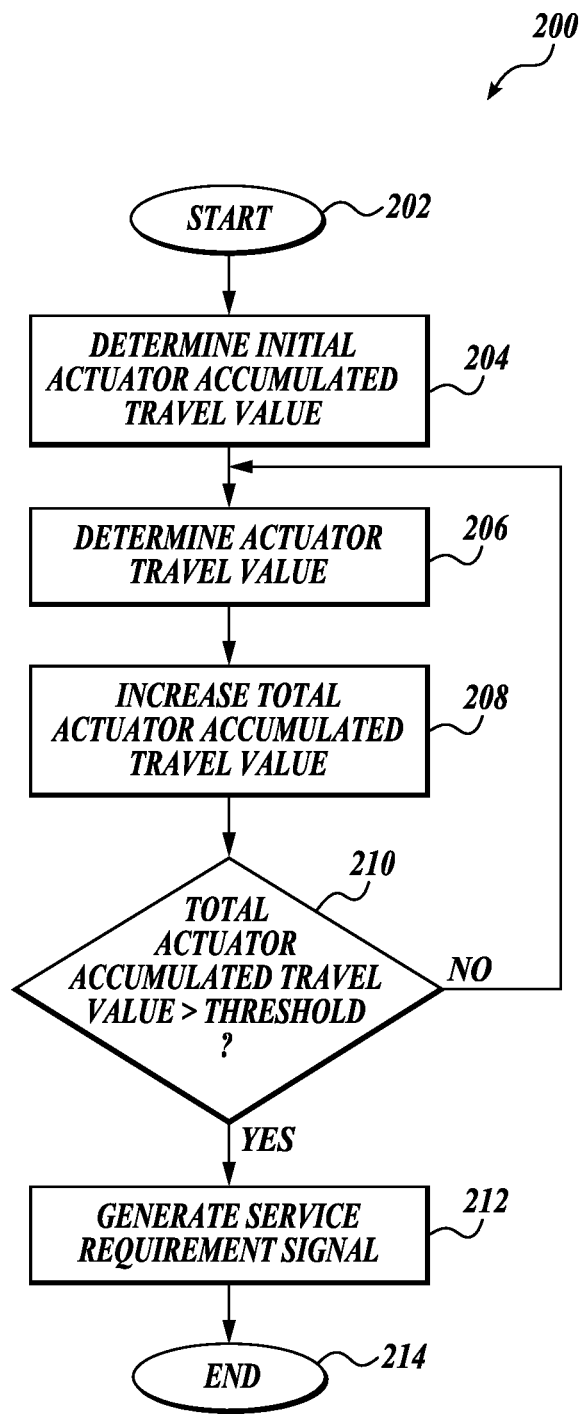
FIG. 5 shows a flow chart of a method for monitoring a service interval for an actuator of a landing gear assembly according to an embodiment of the present disclosure.

FIG. 5 shows a flow chart of a first representative embodiment of a method 200 for of determining a service interval for an actuator of a landing gear assembly. The method 200 starts at block 202 and proceeds to block 204.

In block 204, an initial actuator accumulated travel value is determined. If the actuator has just been serviced, the initial actuator accumulated travel value is set to 0. If the actuator has not just been serviced, the initial actuator accumulated travel value is the same value as the total actuator accumulated travel value at the end of the previous retraction/extension cycle. In some embodiments, the total actuator accumulated travel value is stored on a non-volatile storage such as EEPROM or other suitable storage. The method then proceeds to block 206.

In block 206, an actuator travel value is determined. Then, in block 208, the actuator travel value is added to the total actuator accumulated travel value. As will be explained in further detail, an absolute value of the actuator travel value is added to the total actuator accumulated travel value so that this step always causes the total actuator accumulated travel value to increase or stay the same. Accordingly, the method 200 tracks total actuator travel instead of net actuator travel. That is, actuator travel is accounted for regardless of whether the actuator is extending or retracting the landing gear assembly.

In block 210, total actuator accumulated travel value is compared to a threshold value. The threshold value represents an actuator travel value at which actuator service is desired. In some embodiments, the actuator service is applying grease or other suitable lubricant to the actuator. In some embodiments, the actuator service is inspecting and/or replacing actuator bearings, bushings, hydraulic hoses, and/or any other actuator components that require periodic inspection, servicing, and or replacement.

If the total actuator accumulated travel value is less than the threshold value, then the method 200 returns to block 206 and continues to monitor and track total actuator accumulated travel. If the total actuator accumulated travel value greater than or equal to the threshold value, then the method 200 proceeds to block 212, and the method generates a service requirement signal indicating to an operator, service technician, or other person that the actuator is due for certain maintenance. The method 200 then proceeds to block 214 and ends.

It will be appreciated that the actuator travel value can be determined and added to the total actuator accumulated travel value in a number of different ways, and the present disclosure is not limited to a particular method. In some embodiments, the sensor 92 shown in FIG. 2 senses the position of the drive screw 74. The MCU 106 is programmed to calculate the total actuator accumulated travel value using the actuator drive screw position x according to the following equation:

$$T = \int \left| \frac{d}{dt} x(t) \right| dt + T_i$$

wherein:
T is the total actuator accumulated travel value;
$T_i$ is the initial actuator accumulated travel value;
t is time; and;
x(t) is the position of the drive screw 74 as a function of time.

In some embodiments, a logical processor is programmed to make discrete time calculations of the total actuator accumulated travel value using the actuator drive screw position x according to the following equation:

$$T_t = |x_t - x_{t-1}| + T_{t-1}$$

wherein:
the subscript $_t$ represents the value for the current timestep;
the subscript $_{t-1}$ represents the value at the previous timestep; and
$T_0$ is equal to $T_i$.

It will be appreciated that any number of suitable variations of the above-noted equations may be used to track the total actuator accumulated travel value. Further, the calculations are not limited to being performed by the MCU 106, but can be performed by any suitable processor, controller, programmed circuit, component, or combinations thereof. In addition, the position of the actuator drive screw 74 may be determined directly or indirectly by any suitable sensor of combination of sensors.

In some embodiments the total actuator accumulated travel value may be determined from the rotational speed of the actuator ACME nut, which may be sensed by the sensor 92 shown in FIG. 2. In some embodiments, the rotational speed of the actuator ACME nut may be determined directly or indirectly by any suitable sensor of combination of sensors. The total actuator accumulated travel value may be determined using the linear speed of the actuator ACME screw according to the following equation:

$$T = \int |v(t)| dt + T_i$$

wherein v(t) is the linear speed of the drive screw 74 at a given time t.

In some embodiments, a logical processor is programmed to make discreet time calculations of the total actuator accumulated travel value using rotational speed of the actuator ACME nut according to the following equation:

$$T_t = \frac{|v_t|}{z_t} + T_{t-1}$$

wherein $z_t$ is the discrete time step of the processor.

In some embodiments, the total actuator accumulated travel is determined directly from the drive screw 74. In some embodiments the total actuator accumulated travel value may be determined from the motor 78 that drives the actuator drive screw 74 or from any other component that moves in a known relationship to rotation of the drive screw. That is, the speed and travel of the actuator screw may be indirectly determined from other components. In some embodiments, the rotational speed (RPM) of the motor or a counter value from a motor positional sensor/estimator may be used to determine the speed and/or position of the motor. Nonlimiting examples of monitoring the motor may use one or more of a Hall Effect sensor, a tachometer, a rotary encoder, a sensorless estimation, or any other suitable means of estimated motor speed and/or position. In some embodiments, the motor 78 rotates the drive screw 74 to extend and retract the actuator. For such embodiments, the rotation of the drive screw 74 and/or the translation of the housing/nut relative to the drive screw is sensed directly or indirectly.

For a known motor/drive screw combination, the rotational velocity of the drive screw may be determined by the following equation:

$$v = n_v * RPM$$

wherein $n_v$ is a constant determined by the gearing connecting the motor to the drive screw and also the drive screw lead.

Similarly, a motor positional sensor by be used to determine the position of the drive screw according to the following equation:

$$x = n * C$$

wherein $n_p$ is a constant determined by the gearing connecting the motor to the drive screw and also the drive screw lead; and
C is the value from the motor positional sensor.

By using known relationships between the travel and/or position of the drive screw and various associated components, such as the motor, the total actuator accumulated travel value may be determined by calculating the drive screw travel and/or position or by modifying the equations to use motor travel and/or position as the known quantity.

Figure 6:
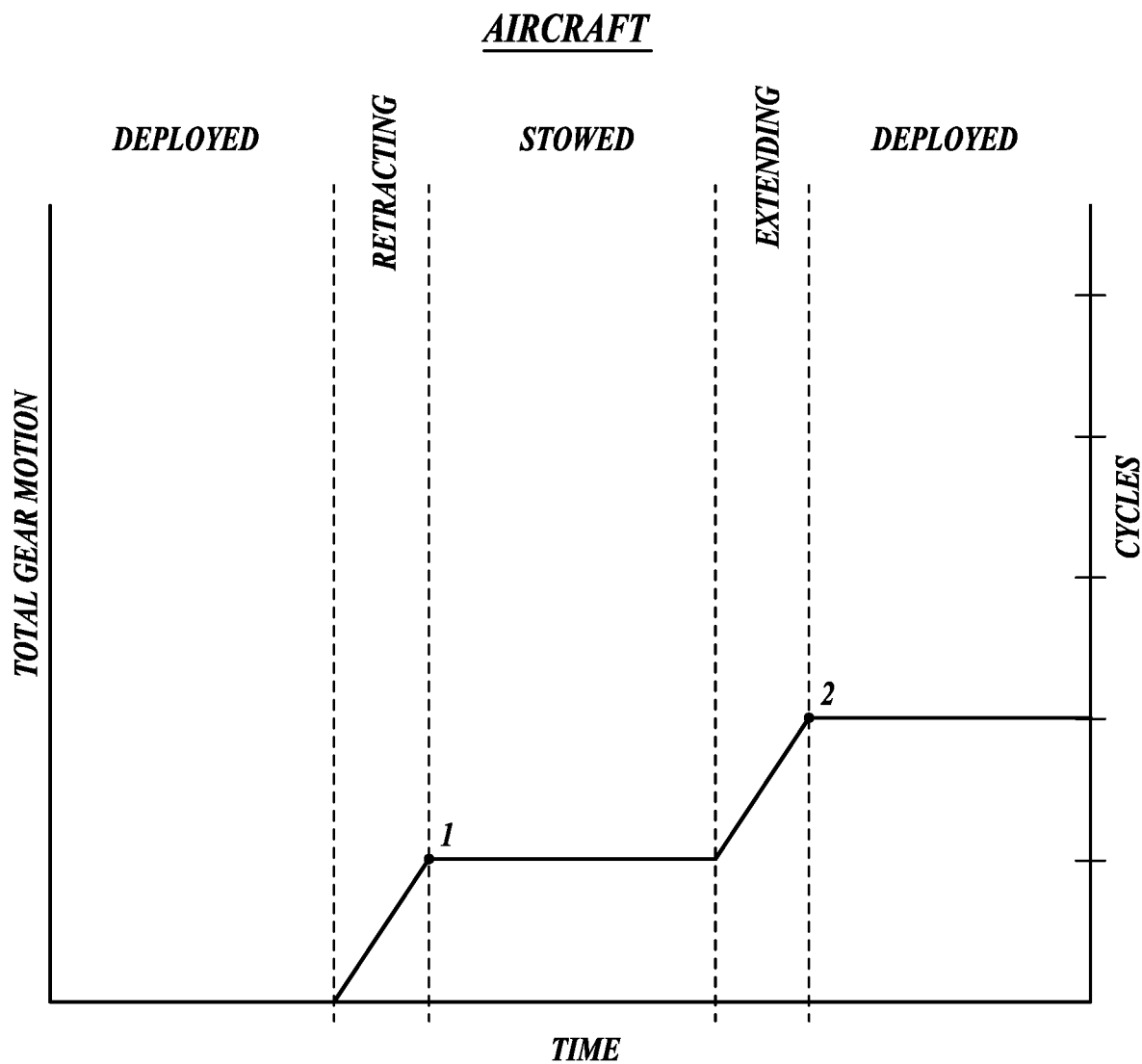
FIG. 6 shows a chart of total landing gear motion for an aircraft during a flight.
Figure 7:
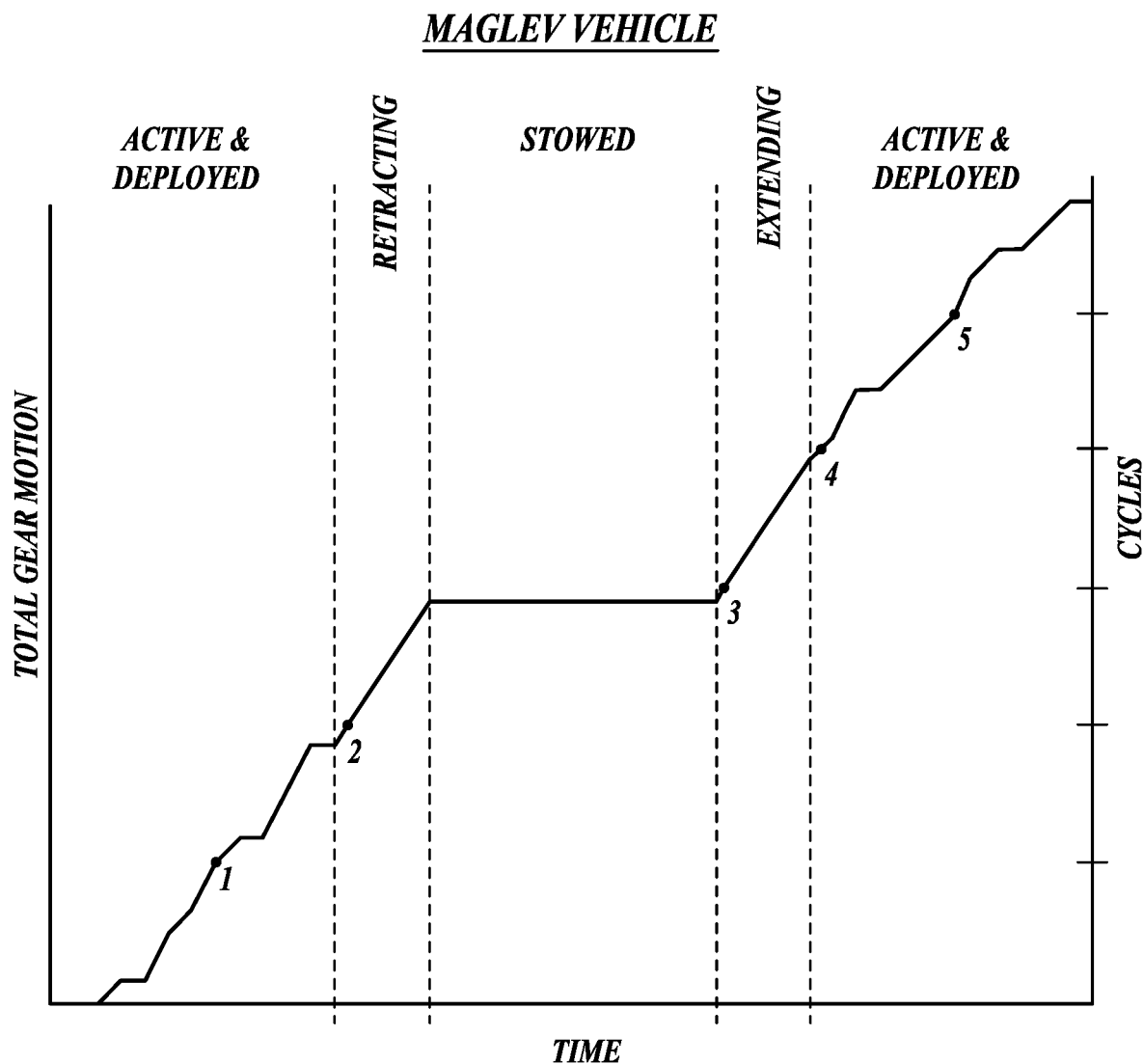
FIG. 7 shows a chart of total landing gear motion for a maglev vehicle traveling from one docking station to another.

Referring now to FIGS. 6 and 7, the number of cycles counted by the method 200 in FIG. 5 for an aircraft retraction and extension and a maglev vehicle retraction and extension, respectively are shown. As shown in FIG. 6, when an aircraft is on the ground, the landing gear is active and deployed. The landing gear maintains a generally fixed position, i.e., no gear motion occurs. During takeoff, the landing gear is retracted at a constant rate until the landing gear reaches the stowed position. A first cycle, indicated by point 1, finishes when the landing gear reaches the stowed position. The landing gear stays in the fixed stowed position with no associated gear motion until just prior to landing. As the aircraft approaches the runway, the landing gear is extended at a constant rate until the landing gear is fully extended. A second cycle, indicated by point 2, finishes when the landing gear reaches the deployed position. No further landing gear motion occurs until the aircraft takes off again. Thus, similar to the known method of FIG. 3, the method 200 of FIG. 5 counts two cycles for the retraction and extension of aircraft landing gears during a takeoff and landing.

Referring now to FIG. 7, when a maglev vehicle is docked, the landing gear is typically extended, but the vehicle is also coupled to the docking station. When secured to the docking station, load and/or height stabilization is not required, and the landing gear remains in a static position. As the vehicle leaves the docking station, the vehicle decouples from the station, and the vehicle is at least partially supported by the landing gear as the magnetic levitation support increases. With the vehicle decoupled from the dock, the landing gear provides load and/or height stabilization, causing the landing gear to extend and retract about the target value. For as long as the stabilization continues, an increase in total landing gear motion attributable to stabilization also continues.

The landing gear retracts at a generally constant rate until the landing gear reaches the stowed position. The landing gear maintains a static stowed position while the vehicle travels fully supported by the magnetic levitation system. As such, the landing gear motion is constant while the landing gear is stowed.

As the vehicle approaches the docking station, the landing gear extends at a constant rate until a wheels-on-ground condition is achieved. With the contacting the ground, the load and/or height stabilization resumes, and the landing gear extends and retracts about the target value. The stabilization causes the total landing gear motion to continue to increase until the vehicle has reached the docking station and is coupled thereto.

In the illustrated embodiment, the total landing gear motion increases at various rates throughout the operation of the maglev vehicle. Each cycle corresponds to a predetermined amount of landing gear travel. Accordingly, while the five identified cycles are spaced evenly along the vertical axis (total gear motion), the spacing along the horizontal axis (time) varies.

Figure 9:
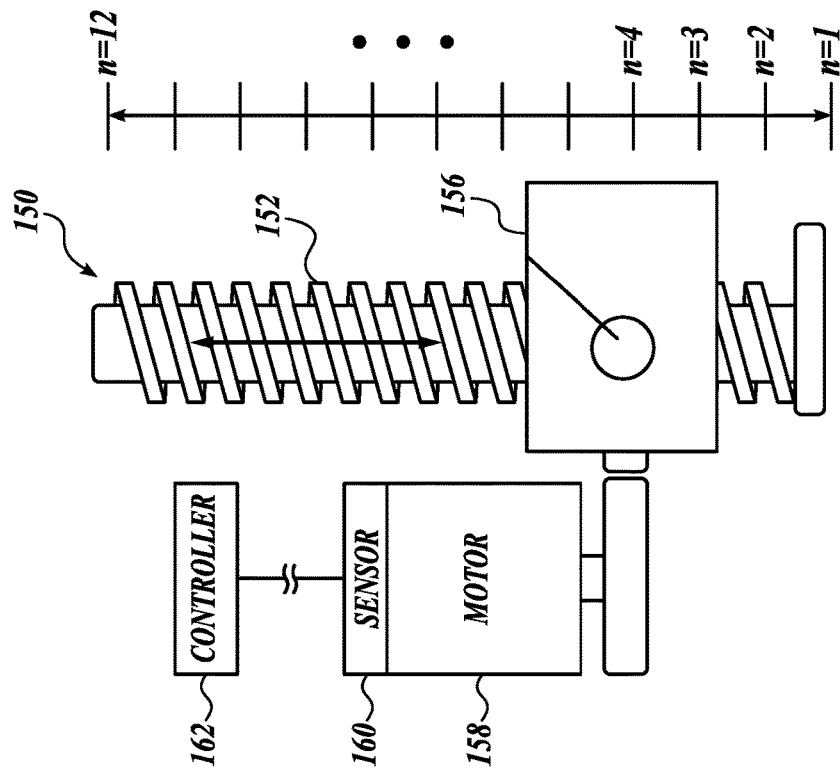
FIG. 9 shows the landing gear assembly of FIG. 8 in a second position.
Figure 8:
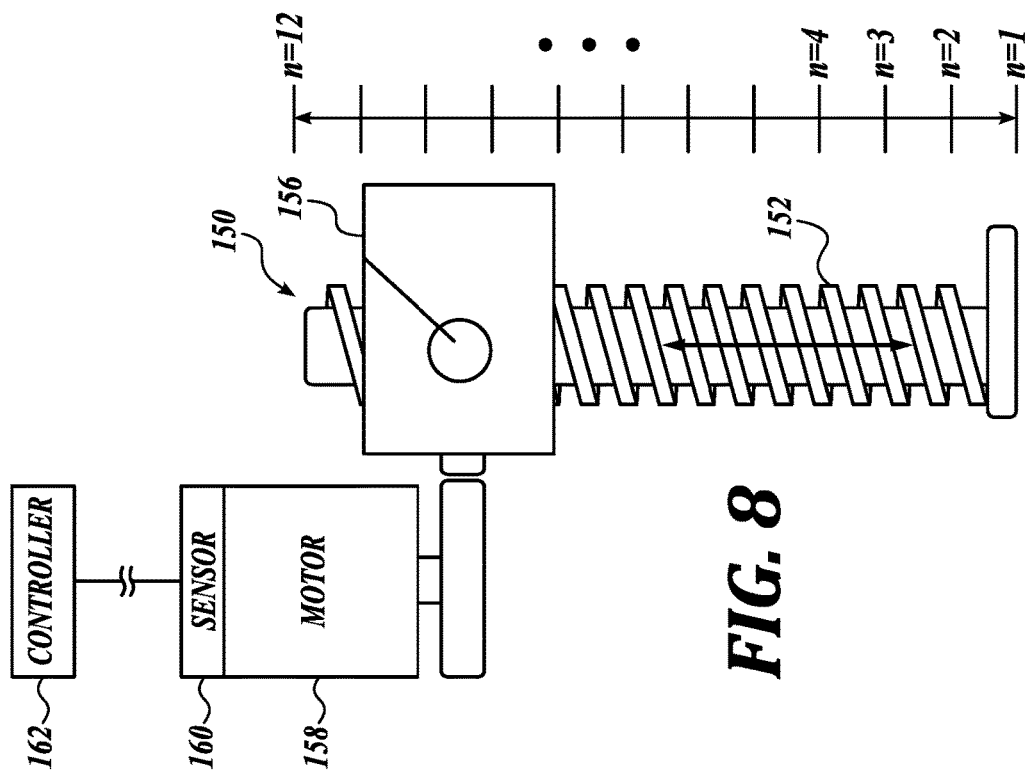
FIG. 8 shows a landing gear assembly configured for a method for monitoring a service interval according to another embodiment of the present disclosure, wherein the actuator is in a first position.
Figure 10:
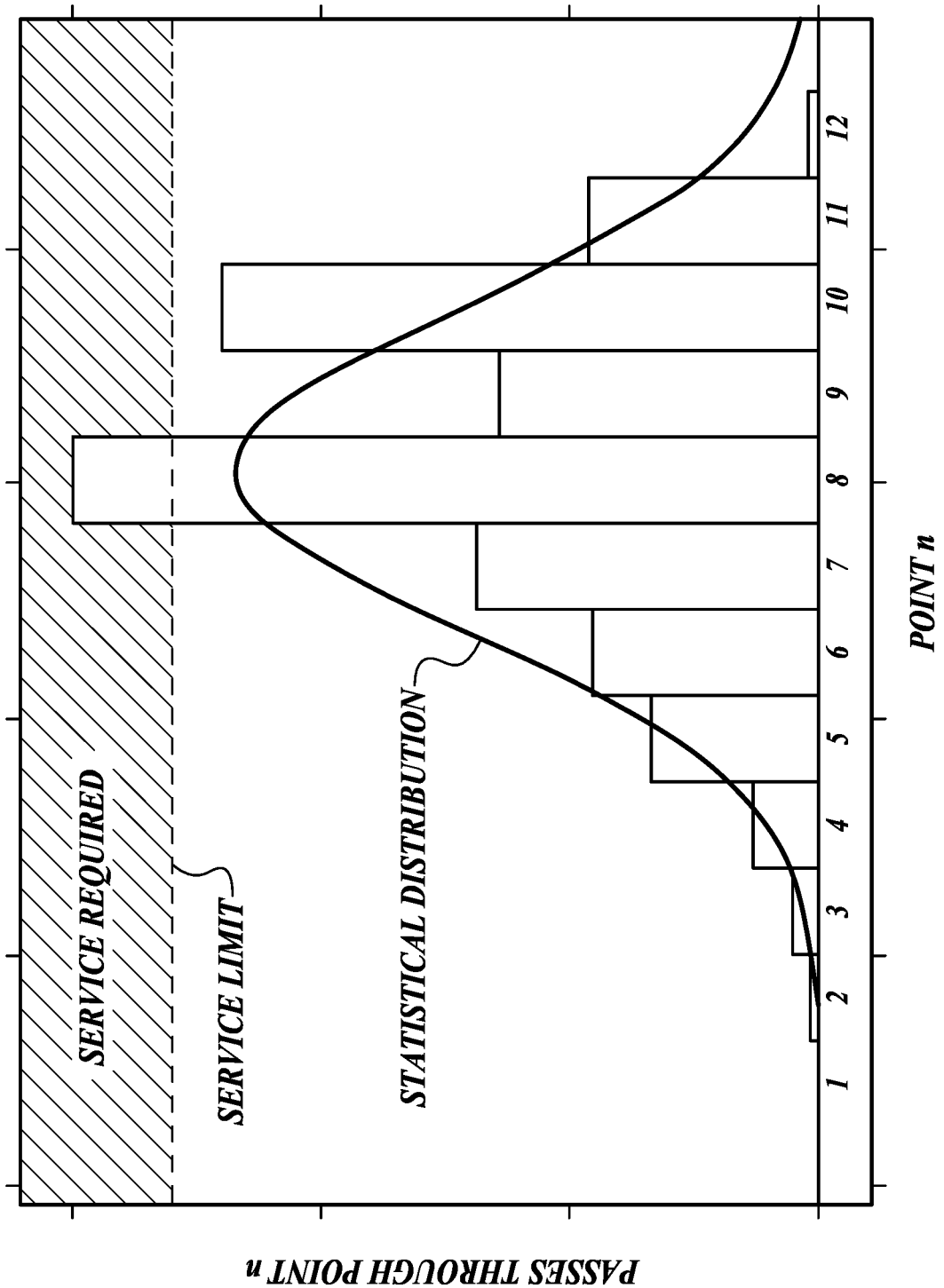
FIG. 10 shows an example of a histogram of predetermined positions of the landing gear assembly of FIG. 8 under typical operating conditions.

Referring now to FIGS. 8-10, a second representative embodiment of a method of determining a service interval for an actuator of a landing gear assembly will be described. Rather than track the specific travel of the drive screw, the illustrated embodiment uses "data binning" to track actuator use and determine service intervals.

FIGS. 8 and 9 show a representative embodiment of part of an actuator 150 similar to the actuator 90 shown in FIGS. 1 and 2. The actuator 150 includes a drive screw 152 threadedly engaged with a nut 156. A motor 158 selectively rotates the nut 156 to translate the drive screw relative to the nut along the longitudinal axis of the drive screw. A sensor 160 is operatively coupled to the motor 158 to sense the position of the drive screw 152 relative to the nut 156, and therefore, the position of the actuator 150. In the illustrated embodiment, the sensor 160 is a Hall sensor that tracks the position of the drive screw 152 by sensing rotational output of the motor; however, it will be appreciated that any suitable number and/or types of sensors suitable for sensing the position and/or travel of the drive screw relative to the nut, directly or indirectly, may be utilized.

To measure the position of the drive screw 152 relative to the nut 156, i.e., the position of the actuator 150, the drive screw 152 is divided into a plurality of segments demarcated by points n. In the illustrated embodiment, the drive screw 152 includes 12 points along the length of the drive screw 152, however, it will be appreciated that any suitable number of points can be included. The sensor 160, which is in communication with a controller 162, senses when one of the points passes through the nut 156 and sends a signal to the controller (e.g., a programmed microprocessor, programmable circuits such as a FPGA, an ASIC, SoC, a DSP, etc., arrangement of digital and/or analog circuits. The controller 162 maintains a running total of how many times each individual point has passed through the nut 156. The controller 162 also maintains a running total of the total number of times any of the points has passed through the nut 156, i.e., the sum of the number of times each point has passed through the nut.

The total number of times any of the points has passed through the nut 156 corresponds to the total overall travel of the actuator. Accordingly, a service threshold number is established to be a number corresponding to the amount of total travel before actuator service is required. When the controller determines that the threshold number has been reached, the controller generates a service requirement signal indicating to an operator, service technician, or other person that the actuator is due for certain maintenance.

The embodiment shown in FIGS. 8 and 9 may also provide monitoring of localized areas of actuator travel that may require service before the overall travel threshold has been reached. When the actuator 150 is used for closed loop control, such as during load or height stabilization of a maglev landing gear assembly, a greater amount of wear and usage occurs around the stabilization setpoint areas. This can result in localized depletion of the grease in high-use areas of the drive screw, which is not necessarily reflected by the total travel of the actuator.

FIG. 10 shows histogram of an exemplary distribution of actuator travel through the points shown in FIGS. 8 and 9 when the actuator is used for closed-loop control. The histogram shows that point 8 and to a lesser extent, point 10, are subjected to significantly more contact with the nut 156 than other portions of the drive screw 152. Accordingly, a predetermined service threshold may be established such that when any individual point reaches a corresponding threshold, the controller 162 generates a service requirement signal. In some embodiments, the service requirement signal indicates that the drive screw of the actuator should be greased, however, the threshold may be set to correspond to any number of suitable service requirements.

The illustrated embodiment provides for generating a service requirement signal when an overall travel threshold is reached, when a localized travel threshold is reached, and/or a combination thereof. In this regard, in some embodiments, the controller 162 is programmed to generate a service requirement signal when the first of (1) an overall travel threshold and (2) a localized travel threshold is reached. In some embodiments, the controller 162 is programmed to generate a service requirement signal when the statistical distribution (shown in FIG. 10) reaches a threshold value rather than an individual point.

Figure 11:
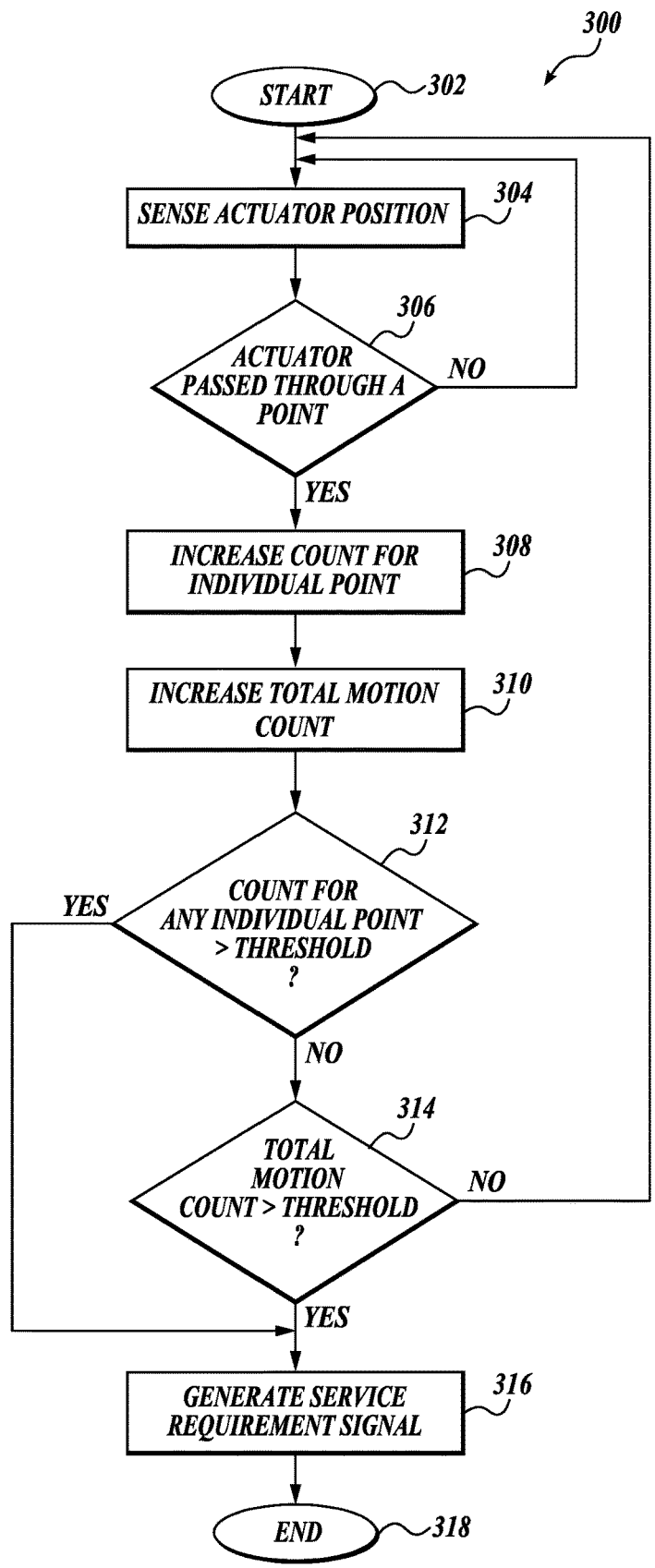
FIG. 11 shows a flow chart of a representative embodiment of a method for monitoring a service interval for an actuator of a landing gear assembly.

FIG. 11 shows a flow chart of a second representative embodiment of a method 300 of determining a service interval for an actuator of a landing gear assembly. The method 300 starts at block 302 and proceeds to block 304.

In block 304, the sensor 160 senses the actuator position. In the illustrated embodiment, the position of the actuator 150 corresponds to the position of the nut 156 relative to the drive screw 152. The sensor 160 generates a signal corresponding the actuator position and sends the signal to the controller 162.

The method 300 then proceeds to block 306, in which the controller 162 determines if the actuator has passed through one of a plurality of predetermined points. If the actuator has not passed through one of the plurality of predetermined points, then the method 300 returns to block 304, and monitoring of the actuator position continues. If the actuator has passed through one of the plurality of predetermined points, then the method 300 proceeds to block 308.

In block 308, the method 300 increases a count for the point through which the actuator passed. The method 300 then proceeds to block 310, in which the method increases a total count for all points through which the actuator has passed, i.e., the total motion count. In some embodiments, both of these counts are maintained until an indicated service is performed, at which point one or both counts may be reset to zero.

The method 300 proceeds to block 312, and the count for each individual point is compared to a corresponding threshold. In some embodiments, the threshold is the same for every point. In some embodiments, some or all of the points have different corresponding thresholds. If the count for any individual point has exceeded the corresponding threshold, then the method proceeds to block 316, and a service requirement signal is generated. If the count for none of the individual points has exceeded the corresponding threshold, then the method 300 proceeds to block 314.

In block 314, the method compares the combined counts for all of the points (total motion count) to a threshold. If the total motion count does not exceed the threshold, then the method returns to block 304, and monitoring of the landing actuator continues. If the total motion count exceeds the threshold, then the method 300 proceeds to block 316, and a service requirement signal is generated. The method 300 then proceeds to block 318 and ends.

The illustrated method provides monitoring for the overall actuator travel, as well as for travel along individual portions of the actuator drive screw. In some embodiments, the method only monitors overall actuator travel. In some embodiments, the method only monitors travel along individual portions of the actuator drive screw.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known method/process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method of indicating a service requirement for an actuator of a landing gear assembly, the actuator positioning the landing gear assembly between a stowed position and a deployed position, the method comprising the steps of:
   receiving from a sensor at least one of a sensed position and a sensed movement of the actuator;
   determining an actuator travel value for a time interval from the at least one of a sensed position and a sensed movement of the actuator;
   increasing a total actuator accumulated travel value by the actuator travel value for the time interval;
   comparing the total actuator accumulated travel value to a predetermined threshold value, and
   generating a signal indicating a service requirement when the total actuator accumulated travel value reaches the predetermined threshold value.

2. The method of claim 1, wherein the step of increasing the total actuator accumulated travel value by the actuator travel value for the time interval comprises adding an absolute value of the actuator travel value to the total actuator accumulated travel value.

3. The method of claim 1, wherein the actuator comprises a drive screw in threaded engagement with a nut, wherein selectively rotation of the nut screw extends and retracts the landing gear assembly.

4. The method of claim 3, wherein the step of determining an actuator travel value for a time interval comprises sensing a nut rotation.

5. The method of claim 3, wherein the step of determining an actuator travel value for a time interval comprises determining a distance traveled by the drive screw relative to the nut.

6. The method of claim 1, wherein the landing gear assembly is configured to provide a stabilization function that extends and retracts the landing gear assembly, wherein at least one time interval occurs during the stabilization function.

7. The method of claim 1, wherein the actuator is one of a linear actuator and a rotary actuator.

8. A method of indicating a service requirement for an actuator of a landing gear assembly, the landing gear assembly being selectively moveable through a plurality of landing gear assembly positions between a stowed position and a deployed position, each landing gear assembly position corresponding to one of a plurality of predetermined actuator positions, the method comprising the steps of:
   sensing an actuator position;
   increasing a total actuator accumulated travel count by a predetermined amount when the sensed actuator position passes through one of the plurality of predetermined actuator positions;
   comparing the total actuator accumulated travel value to a predetermined threshold value; and
   generating a signal indicating a service requirement when the total actuator accumulated travel reaches the predetermined threshold value.

9. The method of claim 8, further comprising the steps of:
   increasing an individual actuator accumulated travel count corresponding to one of the plurality of landing gear assembly positions when the sensed actuator position passes through the corresponding one of the plurality of landing gear assembly positions; and
   comparing each individual actuator accumulated travel count to a corresponding threshold.

10. The method of claim 9, further comprising the step of generating a second signal indicating a service requirement when at least one of the individual actuator accumulated travel counts reaches the corresponding threshold.

11. The method of claim 9, wherein the actuator comprises a drive screw in threaded engagement with a nut, wherein selectively rotation of the nut extends and retracts the landing gear assembly.

12. The method of claim 8, wherein the actuator position is sensed directly.

13. The method of claim 8, wherein the step of determining an actuator travel value for a time interval comprises sensing a nut rotation.

14. The method of claim 8, wherein the step of determining an actuator travel value for a time interval comprises determining a distance traveled by the drive screw relative to the nut.

15. The method of claim 8, wherein the actuator position is sensed indirectly.

16. The method of claim 8, wherein the landing gear assembly is configured to provide a stabilization function that extends and retracts the landing gear assembly, wherein the sensed actuator position passes through at least one of the plurality of predetermined actuator positions during a stabilization function.

17. The method of claim 8, wherein the actuator is one of a linear actuator and a rotary actuator.

* * * * *